United States Patent
Berkey et al.

(10) Patent No.: US 6,606,438 B2
(45) Date of Patent: Aug. 12, 2003

(54) LOW DISPERSION SLOPE FIBER

(75) Inventors: George E. Berkey, Pine City, NY (US); V. Srikant, Ithaca, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/027,899

(22) Filed: Dec. 19, 2001

(65) Prior Publication Data

US 2002/0094179 A1 Jul. 18, 2002

Related U.S. Application Data

(62) Division of application No. 09/295,657, filed on Apr. 21, 1999.
(60) Provisional application No. 60/082,699, filed on Apr. 22, 1998.

(51) Int. Cl.$^7$ ................................................. G02B 6/02
(52) U.S. Cl. ........................ 385/123; 385/124; 385/127
(58) Field of Search ................................. 385/123, 127, 385/124

(56) References Cited

U.S. PATENT DOCUMENTS

| | | | |
|---|---|---|---|
| 5,267,339 A | | 11/1993 | Yamauchi et al. |
| 5,553,185 A | * | 9/1996 | Antos et al. ................ 385/127 |
| 5,613,028 A | | 3/1997 | Antos et al. |
| 5,684,909 A | | 11/1997 | Liu |
| 5,778,128 A | | 7/1998 | Wildeman |
| 5,781,684 A | * | 7/1998 | Liu ............................ 385/124 |
| 5,838,867 A | | 11/1998 | Onishi et al. |
| 5,878,182 A | * | 3/1999 | Peckham .................... 385/123 |
| 5,887,105 A | | 3/1999 | Bhagavatula et al. |
| 5,905,838 A | | 5/1999 | Judy et al. .................. 385/123 |
| 6,091,873 A | * | 7/2000 | Matsuo et al. .............. 385/123 |
| 6,169,837 B1 | | 1/2001 | Kato et al. .................. 385/127 |
| 6,317,551 B1 | * | 11/2001 | Mitchell et al. ............ 385/124 |
| 6,335,995 B1 | * | 1/2002 | Kato et al. .................. 385/123 |
| 6,349,163 B1 | * | 2/2002 | Antos et al. ................ 385/127 |
| 6,396,986 B1 | * | 5/2002 | Berkey et al. .............. 385/123 |

OTHER PUBLICATIONS

H. Hatayama et al, "Dispersion flattened fiber with large effective area", General National Meeting of the Institute of Electronics, Information and Communication Engineers, Mar. 6, 1998, p. 225, XP002946628.

H. Hatayama et al, "Dispersion flattened fiber with large-effective-core area more than 50 $\mu m^2$", OFC '98 Technical Digest, pp. 304–305.

M. Ohashi et al, "Dispersion–Modified Single–Mode Fiber by VAD Method", The Transactions of the IEICE, vol. E 73, No. 4, Apr. 1990, pp. 571–575.

Y. W. Li et al, "Triple–Clad Single–Mode Fibers for Dispersion Shifting", Journal of Lightwave Technology, vol. 11, No. 11, Nov. 1993, pp. 1812–1819.

* cited by examiner

Primary Examiner—Ellen E. Kim
(74) Attorney, Agent, or Firm—Robert L. Carlson; Joseph M. Homa

(57) ABSTRACT

An optical fiber and method of making, wherein the optical fiber alternates between regions having different diameters along its length, wherein the refractive index of said blank and the diameters of said fiber are chosen to result in a fiber having alternating regions of positive and negative dispersion at a wavelength which is greater than 1480 nm, yet preferably has a low net dispersion and dispersion slope. A preferred such profile consists of a core region surrounded by a cladding region, said core region comprised of an central core region which is updoped with respect to said cladding region, said central core region surrounded by a moat region which is downdoped with respect to said cladding region, and said moat region is surrounded by an annular ring region which is updoped with respect to said cladding region. In addition, a family of profiles is presented which may be used to produce very low dispersion slope fibers. When used in conjunction with alternating positive and negative dispersion regions, lower net dispersion slope can be achieved. Alternatively, the family of profiles is useful in conventional WDM applications.

23 Claims, 3 Drawing Sheets

LOW DISPERSION SLOPE FIBER

This application is a divisional 119(e) for U.S. patent application Ser. No. 09/295,657 filed on Apr. 21, 1999, which claims priority from U.S. Provisional patent application Ser. No. 60/082,699 filed on Apr. 22, 1998, the content of which is relied upon and incorporated herein by reference in its entirety.

This application claims the benefit of U.S. Provisional Application No. 60/082,699, filed Apr. 22, 1998.

FIELD OF THE INVENTION

The invention is directed to a method for making an optical fiber having optical properties that systematically vary along its length. This method is particularly useful for making dispersion managed (DM) single-mode optical waveguide fibers.

TECHNICAL BACKGROUND

The recent advent of wavelength division multiplexing and amplifiers has increased system requirements to lower the dispersion and dispersion slope of the optical fiber. Several unique methods of making dispersion managed fiber have previously been disclosed that address these properties nicely. See, for example, U.S. patent application Ser. No. 08/844,997 (Berkey et al.) filed Apr. 23, 1997, and U.S. patent application Ser. No. 08/584,868, filed Jan. 11, 1996, the specifications of which are all hereby incorporated by reference.

Many of the methods to date have been relatively complex and therefore may involve higher cost than more standard methods of manufacture because of this complexity. It would be desirable to develop an alternative, easier method to manufacture optical fiber whose dispersion characteristics vary between positive and negative along the longitudinal direction of the optical fiber, particularly in the 1550 nm operating window.

SUMMARY AND DESCRIPTION OF THE INVENTION

One aspect of the present invention relates to an optical fiber having different diameters along its length, and a method of making such fiber. The index of refraction profile of the optical fiber preform is selected so that, when the optical fiber preform is drawn into an optical fiber having such differing diameters along its length, the result is an optical fiber which varies along its longitudinal length (i.e., corresponding to the regions of differing diameters) between regions of negative and positive dispersion in the 1550 nm operating window, which preferably consists at least of the window between about 1480 and about 1625 nm. In some embodiments, the fiber also varies between regions of negative and positive dispersion slope along the length of the fiber in the 1550 nm operating window, or additionally or alternatively maintains a very low dispersion slope along the length of the fiber. Fibers made in accordance with this method are excellent candidates for dispersion managed fiber applications.

Modern feedback control loops can be used to control both downfeed rate and draw rate to control fiber diameters. The fiber O.D. change is most quickly achieved by changing the tractor (fiber take-up) speed and thus the draw rate. As a result, the diameter of the core of the fiber changes as the tractor speed changes, thereby enabling the transition region between different diameters to be kept relatively short. In preferred embodiments, the fiber is drawn so that the segments of different diameters differ in magnitude of outside fiber diameter by greater than 3 microns, more preferably greater than 5 microns, and most preferably greater than 10 microns measured at the outside diameter of the fiber. Also, the fiber is preferably alternates between sections which are between 100 m and 3 km in length, and more preferably the alternating sections are least 250 m in length and less than 2 km.

Not just any refractive index profile can be employed to produce a fiber having such varying negative and positive dispersion characteristics along its length. For example, standard single mode fiber changes dispersion very little with diameter, particularly at 1550 nm. One preferred family of refractive index profiles which enables a fiber having the desired alternating dispersion characteristics, when drawn to differing diameters along its length, consists of a core region surrounded by a cladding region, wherein the core region comprises a central core region which is updoped with respect to said cladding region, the central core region is surrounded by a moat region which is downdoped with respect to said cladding region, and the moat region is surrounded by an annular ring region which is updoped with respect to said cladding region. Such profiles include those wherein the central updoped segment has an index of refraction delta percent between about +0.5 to 1.5, the depressed moat core region which surrounds the central core region has a delta percent in the range of about −0.1 to −0.7, and the updoped annular ring has a delta percent between about 0.1 to 1.0. The radii of the three segments (measured from the centerline of the fiber to the extrapolated intersection of the segment refractive index profile with the x-axis, the x-axis being equal to the index of refraction of the cladding layer) is selected so that, if the radius of the first centerline up-doped segment is taken to be a, the radius of the moat section taken to be b, then b/a preferably is between about 1.5 to 3.0, and if the outer radius of the optional annular ring is c, then c/a is between about 2.5 and 3.7. More preferred radius and delta percent values for such profiles will be discussed further below.

The result is a fiber which can be made to vary along its length between regions of negative and positive dispersion, yet has a net dispersion and dispersion slope which are both relatively low. Preferred fibers made in accordance in the present invention can be designed to alternate between local positive and negative dispersions having a magnitude at 1550 between 1.5 and 20 ps/nm-km, yet yield a net dispersion of less than 1.0 ps/nm-km, more preferably less than 0.5 ps/nm-km, and most preferably less than 0.1 ps/nm-km at 1550 nm. Preferred fibers made in accordance in the present invention yield a dispersion slope of less than 0.03 ps/nm$^2$-km, more preferably less than 0.01 ps/nm$^2$-km, and most preferably less than 0.005 ps/nm$^2$-km over the wavelength range 1480 to 1625 nm.

Another aspect of the present invention relates to an optical fiber formed from a family of index of refraction profiles which can be made to exhibit a very low dispersion and, perhaps more importantly, a very low dispersion slope, in the 1550 nm operating window. This preferred family of index of refraction profiles is capable of achieving a wide variety of magnitudes of dispersion, yet at the same time extremely low dispersion slopes can be achieved.

Consequently, this particular profile is capable of yielding very useful dispersion managed fiber products made in accordance with the invention described above, i.e., by providing varying diameters along its length, with the result that the dispersion slope of the fiber is still maintained at a very low level. The index of refraction profile of the optical fiber preform is selected so that, when the optical fiber preform is drawn into an optical fiber having such differing diameters along its length, the result is an optical fiber which varies along its longitudinal length (i.e., corresponding to the regions of differing diameters) between regions of negative and positive dispersion in the 1550 nm operating window, which preferably consists of the window between about 1480 and about 1625 nm. Because this family of profiles is capable of achieving a wide variety of magnitudes of dispersion, yet at the same time exhibiting extremely low dispersion slopes, this family of profiles is particularly preferred for making fibers having alternating diameters, and consequently alternating dispersion characteristics, along their length. Such fibers made in accordance in the present invention can be made to have a wide variety of alternating positive and negative dispersion values in the 1550 nm operating window, yet the net dispersion along the entire length of the fiber is still maintained relatively low. Likewise, the dispersion slope can be maintained at a low value, i.e., less than 0.03 ps/nm$^2$-km, more preferably less than 0.01 ps/nm$^2$-km, and most preferably less than 0.005 ps/nm$^2$-km over the wavelength range 1480 to 1625 nm. To obtain the most preferred low slope properties with this preferred family of profiles, in addition to the refractive index versus radius relationships disclosed above, the ratio of the index delta percents of the up-doped annular ring segment to that of the centerline up-doped segment is between about 0.4 to 1.1, more preferably between about 0.6 to 0.9.

Alternatively, this unique preferred family of index of refraction profiles is valuable for use in the manufacture of more conventional optical fibers which have unitary diameter, dispersion and dispersion slope characteristics along their length. For example, optical fibers have been made which have a uniform refractive index profile (and uniform core and clad diameters) along the axial length of the fiber, and yield a local dispersion of more than 1.0 ps/nm-km, as well as a dispersion slope of less than 0.03 ps/nm$^2$-km, more preferably less than 0.01 ps/nm$^2$-km, and most preferably less than 0.005 ps/nm$^2$-km over the wavelength range 1480 to 1625 nm. Such properties are particularly advantageous for use in wavelength division multiplexing applications. Again, in order to obtain the most preferred low slope properties in this family of refractive index profiles, in addition to the refractive index versus radius relationships disclosed above, the ratio of the index delta percents of the up-doped annular ring segment to that of the centerline up-doped segment is between about 0.4 to 1.1, more preferably between about 0.6 to 1.0.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

In a preferred embodiment of the invention, a glass optical fiber preform is manufactured which has an index of refraction profile sufficient so that, when the fiber is drawn into an optical fiber having the different diameters along its length, the result is an optical fiber which also varies along its longitudinal length (i.e., corresponding to the regions of differing diameters) between regions of negative and positive dispersion and also between regions of negative and positive dispersion slope in the 1550 nm operating window, which preferably consists of the window between 1480 and 1625 nm.

Figure 1:
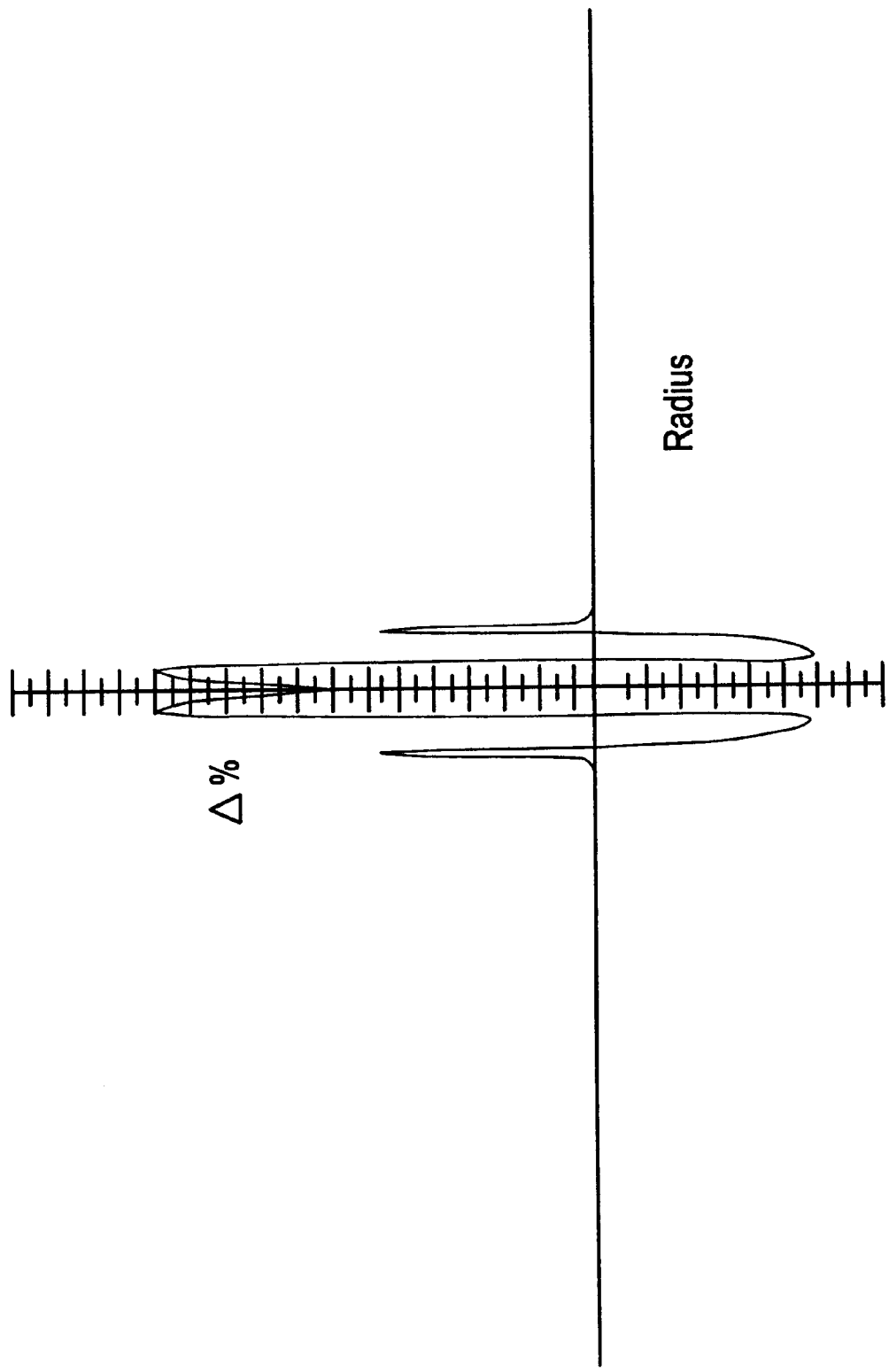
FIG. 1 illustrates a first profile for use in making an optical fibers whose dispersion characteristics vary between negative and positive along its length in accordance with the present invention.
Figure 2:
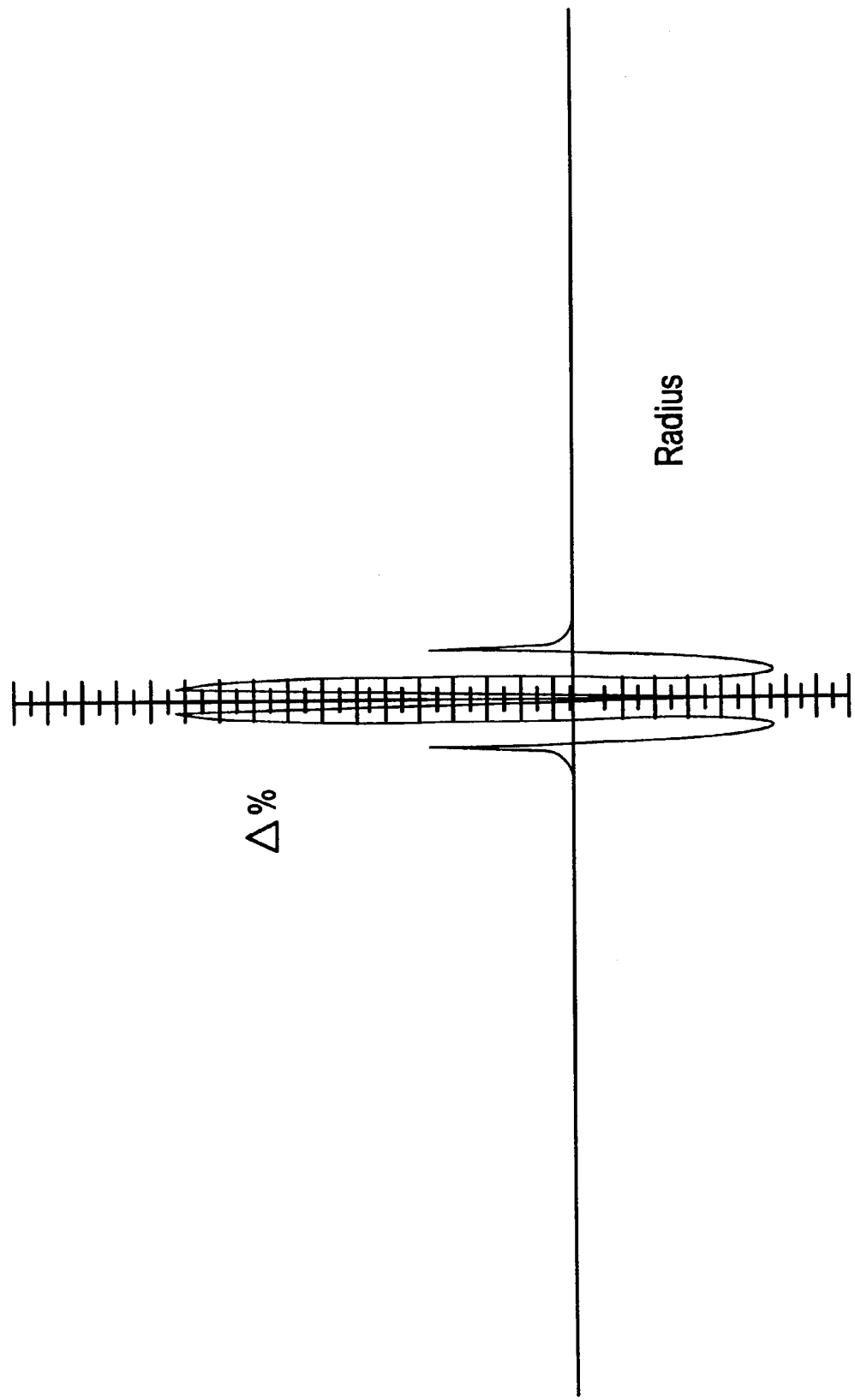
FIG. 2 illustrates a second index of refraction profile which can be used to make a fiber having varying dispersion characteristics along its length in accordance with the present invention.

Such a core refractive index profile is illustrated in FIGS. 1 and 2. In FIGS. 1 and 2, the index of refraction delta percent of the cladding corresponds to zero on the Y-axis. Both of the profiles illustrated in FIGS. 1 and 2 exhibit an updoped centerline core region which is surrounded by a moat and updoped annular ring. The moat between the centerline region and the annular ring preferably is downdoped with respect to the cladding.

The profiles of the type illustrated in FIGS. 1 and 2 comprise a central core region having a delta percent, relative to the cladding (wherein delta $(n_1^2-n_2^2)/2n_1^2$, $n_1$ being the refractive index of the region of interest such as the central core region and $n_2$ being the refractive index of the region to which the region of interest is being compared, herein the cladding region, and wherein the refractive index delta can conveniently be multiplied by 100 and expressed on a percentage basis, or "index of refraction delta percent" otherwise called "index delta percent" or "delta percent" or "Δ%"), between about +0.4 to 1.1 and a depressed moat core region which surrounds the central core region. The depressed moat preferably is in the range of −0.15 delta percent or lower (preferably no lower than −0.6 delta percent) relative to the cladding, wherein delta=$(n_1^2-n_2^2)/2n_1^2$. An optional updoped annular ring may also be employed. In some preferred embodiments wherein the updoped annular ring is employed, the annular ring exhibits a delta percent which is between +0.10 and +0.8. In the embodiment illustrated in FIG. 1, the central core has a delta percent of about +0.85, a depressed moat of −0.4 delta percent, and an annular ring surrounding the depressed moat which has a delta percent of about 0.4 delta percent. Thus, as illustrated in the Figures and from the description above and below, an updoped region has a positive index of refraction delta percent relative to the cladding region, and a downdoped region has a negative index of refraction delta percent relative to the cladding region.

The radii of the three segments is measured from the centerline of the fiber to the extrapolated intersection of the refractive index profile with the x-axis, the x-axis being equal to the index of refraction of the cladding layer. In the embodiments illustrated in FIGS. 1–3, the cladding layer is silica. Consequently, in FIGS. 1–3, the outer radius of the central segment is measured from the centerline to the intersection of the central segment refractive index profile with the x-axis, the radius of the moat segment is measured from the centerline to the intersection of the moat segment of the refractive index profile with the x-axis, and the radius of the annular ring region is measured from the centerline to the extrapolated intersection of the outer, relatively straight portion of the annular ring refractive index profile with the x-axis (the tail-off region at the outermost region of the annular ring nearest the cladding layer is not considered part of the annular ring for purposes of determining the outer radius of this region). The refractive index profile is preferably selected so that, if the radius of the first centerline up-doped segment is taken to be "a", the radius of the moat section taken to be "b", then b/a preferably is between about 1.5 to 3.0, more preferably between about 2 and 2.5. If the outer radius of the optional annular ring is "c", then c/a is preferably between about 2.5 and 3.2.

The profiles disclosed in FIGS. 1 and 2 meet these radius limitations and also comprise a central core region having a delta percent between about +0.7 to 1.0, a depressed moat core region in the range of −0.25 to −0.5 percent delta, and an annular ring surrounding the depressed moat in the range of about +0.2 to +0.8 percent.

Such refractive index profiles can be made using any of the techniques known in the art, and preferably are made using a chemical vapor deposition technique such as the outside vapor deposition (OVD) process, the vapor axial deposition (VAD) process, or the inside vapor (MCVD) deposition process. The preferred manufacturing technique is via OVD. Conventional dopant materials can be used for the doping of the silica, e.g., germania can be used for updoping and fluorine can be used for downdoping.

After a preform is made having the desired core refractive index profile, a fiber is drawn from the preform which has a different diameter along its length. By different, it is meant that the difference in diameters between these alternating sections is sufficient to result in noticeably different properties along the length of the fiber. For example the different diameters may be separated by a difference of more than three (3), more preferably more than five (5) microns.

The core profile illustrated in FIG. 1 has dispersion properties that are very sensitive to core diameter. Normally this is considered a bad attribute as fiber manufacturers would normally prefer a wide core diameter tolerance in order to facilitate control of the manufacturing process to produce higher yields. Yet, we have found that, by employing the methods of the present invention, the sensitivity of the profile shown in FIG. 1 can be used advantageously to achieve dispersion management by simply drawing the preform blank to different outside fiber diameters.

Set forth below in Table 1 are the dispersion properties at 1550 nm for a fiber drawn, in accordance with the invention, from an optical fiber preform having the refractive index illustrated in FIG. 1. The FIG. 1 profile is remarkable for its symmetry of substantially matching both the dispersion and dispersion slopes when the core is drawn at different diameters. Table I illustrates the dispersion properties achieved when drawing a fiber having the refractive index profile illustrated in FIG. 1 at diameters of of 115, 125, and 135 microns.

TABLE I

| Fiber O.D. | Dat 1550 | Slope | Zero Dispersion Wavelength |
|---|---|---|---|
| 115 | −7.08 | −.03 | 1315 |
| 125 | +1.87 | +.001 | |
| 135 | +9.3 | +.025 | 1179 |

By drawing the optional fiber preform having the index of refraction illustrated in FIG. 1 into a fiber whose outside diameters alternated between 115 and about 133.5 microns, one can achieve near zero net dispersion with very low slope over the length of the fibers. Table II shows the dispersion properties for a 14 km section of fiber alternately drawn as described above, i.e., into a fiber whose outside diameter alternated between 115 and 133.5 microns (i.e., a difference in diameter between alternating adjacent sections which is greater than 10 microns) every 500 meters. Of course the segment lengths need not be of equal length to best compensate the dispersion of various profiles, and instead these lengths can be varied according to the desired dispersion characteristics of the fiber. Because the fiber is drawn to have varying outside diameters, the physical core of the fiber will also likewise have varying diameters. The net total dispersion of the resultant fiber is −0.17 ps/nm-km at 1550 with a slope of about 0.00158 ps/nm$^2$-km over the wavelength range of 1480 to 1625 nm. Also important is the fact that the zero dispersion wavelength is in all cases outside the 1500 to 1700 nm range. The fiber illustrated with reference to Table II also exhibited a mode field diameter of about 25.5 microns, and a zero dispersion wavelength of about 1440.68.

TABLE II

| Wavelength (nm) | Total Dispersion −14 km |
|---|---|
| 1500 | −0.09362 |
| 1505 | −0.10151 |
| 1510 | −0.10941 |
| 1515 | −0.11730 |
| 1520 | −0.12519 |
| 1525 | −0.13308 |
| 1530 | −0.14097 |
| 1535 | −0.14886 |
| 1540 | −0.15675 |
| 1545 | −0.16465 |
| 1550 | −0.17254 |
| 1555 | −0.18043 |
| 1560 | −0.18832 |
| 1565 | −0.19621 |
| 1570 | −0.20410 |
| 1575 | −0.21199 |
| 1580 | −0.21988 |
| 1585 | −0.22778 |
| 1590 | −0.23567 |
| 1595 | −0.24356 |
| 1600 | −0.25145 |

Although the disadvantage to fibers produced in this manner is that the fiber is not a uniform 125 micron OD, the advantage is that it can be offered at a significantly lower cost than other unitary dispersion managed fibers because of the simplicity of the manufacturing technique employed to make it.

Figure 3:
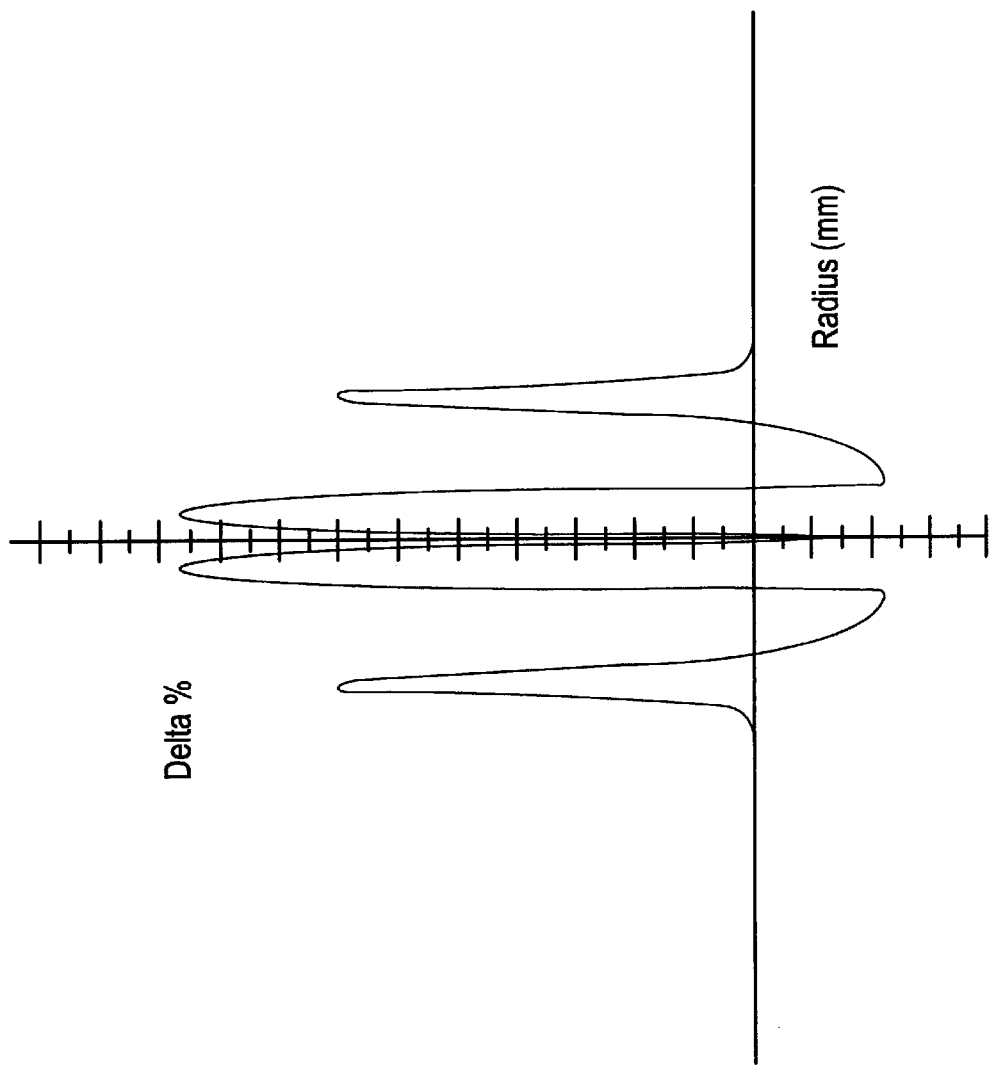
FIG. 3 illustrates a third index of refraction profile which can be used to make a fiber having varying dispersion characteristics along its length in accordance with the present invention, and which also exhibits very useful properties when employed in an optical fiber having unitary diameter and dispersion properties along its length.

FIG. 3 illustrates a preferred refractive index profile which may be used in accordance with the present invention to form fibers whose dispersion in the 1550 nm operating window alternates between positive and negative along the longitudinal length of the fiber. The family of index of refraction profiles illustrated by the embodiment shown in FIG. 3 are particularly useful for producing low dispersion slope optical fiber products having a wide variety of magnitudes of alternating positive and negative dispersion in the 1550 nm operating window or at 1550 nm. For example, the refractive index versus radius relationships can be chosen so that, by using the method disclosed above wherein a fiber is drawn at differing diameters along its length, a wide variety of magnitudes of alternating positive and negative dispersion can be achieved, yet low dispersion and dispersion slope is still maintained. This enables the formation of a fiber which alternates between relatively matched positive and negative dispersion values having magnitudes between 1.5 and 20 ps/nm-km, yet stil maintain a net dispersion over the length of the fiber which is very low. For example, the refractive index profile can be chosen to result in a fiber which alternates along its length between segments of about +5.0 and −5.0 ps/nm-km, the net total dispersion being less than 1.0 ps/nm-km, more preferably less than 0.5 ps/nm-km, and most preferably less than 0.1 ps/nm-km at 1550 nm, and the dispersion slope of the fiber at all times being less than 0.03 ps/nm$^2$-km, more preferably less than 0.01 ps/nm$^2$-km, and most preferably less than 0.005 ps/nm$^2$-km over the wavelength range 1480 to 1625 nm. This dispersion slope could be made to alternate between regions of positive and negative dispersion slope, or alternatively could be made to be entirely positive or negative along the entire length of the fiber.

The refractive index profiles described herein are also useful for forming optical fibers having relatively unitary dispersion and dispersion slope characteristics, particularly the family of profiles described with respect to FIG. 3. This family of index of refraction profiles can be used to provide a wide range of magnitudes of dispersion of either positive or negative values, depending on the desired dispersion value, yet still maintain relatively low dispersion slope in the 1550 operating window.

The profile has an up-doped centerline segment having a maximum delta preferably between about 0.4 and 1.0 percent with respect to the refractive index of the cladding, more preferably between about 0.6 and 0.95 delta percent (with respect to the index of refraction of the cladding, which in a preferred embodiment is undoped silica). The updoped centerline segment is surrounded by a downdoped ring segment, which in turn is surrounded by an updoped annular ring segment. The downdoped moat section preferably has a delta between about −0.1 to −0.4 percent, more preferably between about −0.15 and −0.3 delta percent, between the centerline up-doped segment and the up-doped annular ring segment. The annular ring region located outside the moat region preferably has a delta between about 0.2 to 1.0 percent, more preferably between about 0.4 and 0.8 delta percent.

The updoped annular ring should preferably approximate the height of the central segment of the core in order to obtain the most preferred dispersion slope properties. Thus, to obtain the most preferred low slope properties, the ratio of the delta index percent of the up-doped annular ring segment to that of the delta percent of the centerline up-doped segment is between about 0.6 to 1.1, more preferably between about 0.7 to 1.0.

The outer radii of the three segments (measured to the extrapolated intersection with the x-axis, the x-axis being equal to the index of refraction of the cladding layer) is preferably selected so that if the outer radius of the first centerline up-doped segment is a, the outer radius of the moat section is b, and the outer radius of the annular ring is c, then b/a is between about 1.8 to 2.7, more preferably between about 2 to 2.5, and c/a is between about 2.8 to 3.7, more preferably about 3 to 3.5. For example, in the embodiment illustrated in FIG. 3, b/a is about 2.36, and c/a is about 3.43.

A fiber preform was made having the refractive index profile illustrated in FIG. 3, and drawn at a varying draw speed so that the outside diameter of resultant optical fiber varied between about 118 and 132 microns. The resultant optical fiber segments exhibited the following dispersion properties at 1550 nm, illustrated in Table III.

TABLE III

| 1550 D | Dslope | EffArea |
|---|---|---|
| −7.1801 | −0.0011 | 48.5717 |
| −1.5082 | −0.0019 | 45.9591 |
| 3.4363 | 0.0061 | 44.8433 |
| 7.4290 | 0.0164 | 44.6727 |

Note that, even though the dispersion at 1550 nm could be selected to vary (i.e., by varying the diameter of the fiber) anywhere between about −7 and +7 ps/nm-km, the dispersion slope was at all times less than 0.02 ps/nm$^2$-km. Consequently, the use of a refractive index profile as illustrated in FIG. 3 enables the formation of optical fibers having extremely low dispersion slopes in the 1550 nm wavelength range, i.e., between about 1480 and 1625 nm.

Also, note that at all times the effective area of the resultant fibers were greater than 44. Using the refractive index profile illustrated in FIG. 3, it is easy to achieve effective areas greater than 30, more preferably greater than 35, and most preferably greater than 40 microns$^2$.

Because this family of refractive index profiles is capable of producing fibers having a variety of positive of negative dispersion magnitudes at 1550 nm or in the 1550 nm operating window, and additionally are able to maintain the desirable combination of large effective area (e.g., greater than 40) and low dispersion slope in the 1550 operating window, it is believed that this refractive index profile would also be very useful as an optical fiber having unitary dispersion and dispersion slope characteristics along its length (rather than being drawn to varying diameters). These profiles have applicability as an optical fiber for all DWM transmission applications, including soliton, NRZ and RZ applications.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical fiber comprising:
    a core region surrounded by a cladding region, the core region comprising:
        a centerline region having an outer radius and a maximum index of refraction delta percent;
        a moat region surrounding the centerline region and having an outer radius and a minimum index of refraction delta percent; and
        an annular ring region surrounding the moat region and having an outer radius and a maximum index of refraction delta percent;
    wherein the cladding abuts the annular ring region; and
    wherein the relative refractive indexes and radii of the regions are selected to yield a local dispersion which is greater than 1 ps/nm-km at 1550 nm, and a dispersion slope less than 0.03 ps/nm²-km over the wavelength range 1480 to 1625 nm.

2. The optical fiber of claim 1, wherein dispersion slope is less than 0.02 ps/nm²-km over the wavelength range 1480 to 1625 nm.

3. The optical fiber of claim 1, wherein dispersion slope is less than 0.01 ps/nm²-km over the wavelength range 1480 to 1625 nm.

4. The optical fiber of claim 1, wherein dispersion slope is less than 0.005 ps/nm²-km over the wavelength range 1480 to 1625 nm.

5. The optical fiber of claim 1, wherein the optical fiber has a zero dispersion wavelength outside a range of 1500 to 1700 nm.

6. The optical fiber of claim 1, wherein the optical fiber has an effective area or greater than about 30 $\mu m^2$.

7. The optical fiber of claim 1, wherein the optical fiber has an effective area or greater than about 35 $\mu m^2$.

8. The optical fiber of claim 1, wherein the optical fiber has an effective area or greater than about 40 $m^2$.

9. The optical fiber of claim 1, wherein the relative refractive indexes and radii of the regions are selected to yield a local dispersion greater than 1 ps/nm-km over the wavelength range 1480 to 1625 nm.

10. The optical fiber of claim 1, wherein the annular ring region has a maximum index of refraction delta percent, relative to the cladding, between 0.1 and 1.0.

11. The optical fiber of claim 10, wherein the annular ring region has a maximum index of refraction delta percent, relative to the cladding, between 0.2 and 1.0.

12. The optical fiber of claim 11, wherein the annular ring region has a maximum index of refraction delta percent, relative to the cladding, between 0.4 and 0.8.

13. The optical fiber of claim 1, wherein the centerline region has a maximum index of refraction delta percent, relative to the cladding, between 0.4 and 1.0.

14. The optical fiber of claim 13, wherein the centerline region has a maximum index of refraction delta percent, relative to the cladding, between 0.6 and 0.95.

15. The optical fiber of claim 1, wherein the moat region has a minimum index of refraction delta percent, relative to the cladding, between −0.4 and −0.1.

16. The optical fiber of claim 15, wherein the moat region has a minimum index of refraction delta percent, relative to the cladding, between −0.3 and −0.1.

17. The optical fiber of claim 1, wherein the ratio of the maximum index of refraction delta percent of the annular ring region and the maximum index of refraction delta percent of the centerline region is between 0.6 and 1.1.

18. The optical fiber of claim 17, wherein the ratio of the maximum index of refraction delta percent of the annular ring region and the maximum index of refraction delta percent of the centerline region is between 0.7 and 1.0.

19. The optical fiber of claim 1, wherein the ratio of the outer radius of the moat region and the outer radius of the centerline region is between 1.8 and 2.7.

20. The optical fiber of claim 19, wherein the ratio of the outer radius of the moat region and the outer radius of the centerline region is between 2 and 2.5.

21. The optical fiber of claim 1, wherein the ratio of the outer radius of the annular ring region and the outer radius of the centerline region is between 2.8 and 3.7.

22. The optical fiber of claim 21, wherein the ratio of the outer radius of the annular ring region and the outer radius of the centerline region is between 3 and 3.5.

23. The optical fiber of claim 1, wherein the dispersion slope at 1550 nm is greater than 0.

* * * * *

UNITED STATES PATENT AND TRADEMARK OFFICE
CERTIFICATE OF CORRECTION

PATENT NO.     : 6,606,438 B2
DATED          : August 12, 2003
INVENTOR(S)    : Berkey George E. et al.

It is certified that error appears in the above-identified patent and that said Letters Patent is hereby corrected as shown below:

Column 9,
Line 17, "has an effective area or greater than about 30 $\mu m^2$." should be -- has an effective area of greater than about 30 $\mu m^2$. --
Line 19, "has an effective area or greater than about 35 $\mu m^2$." should be -- has an effective area of greater than about 35 $\mu m^2$. --
Line 21, "has an effective area or greater than about 40 $m^2$." should be -- has an effective area of greater than about 40 $\mu m^2$. --

Signed and Sealed this

Twenty-first Day of October, 2003

JAMES E. ROGAN
*Director of the United States Patent and Trademark Office*